May 16, 1944.　　T. WUPPERMANN ET AL　　2,348,873
ADJUSTABLE BEARING
Filed Jan. 27, 1940　　2 Sheets-Sheet 1
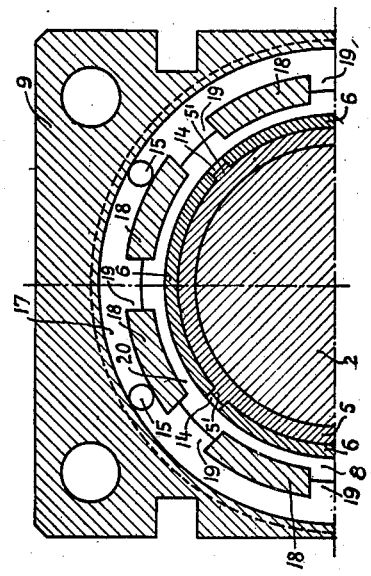
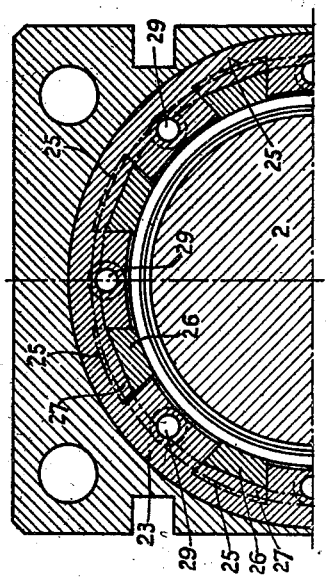
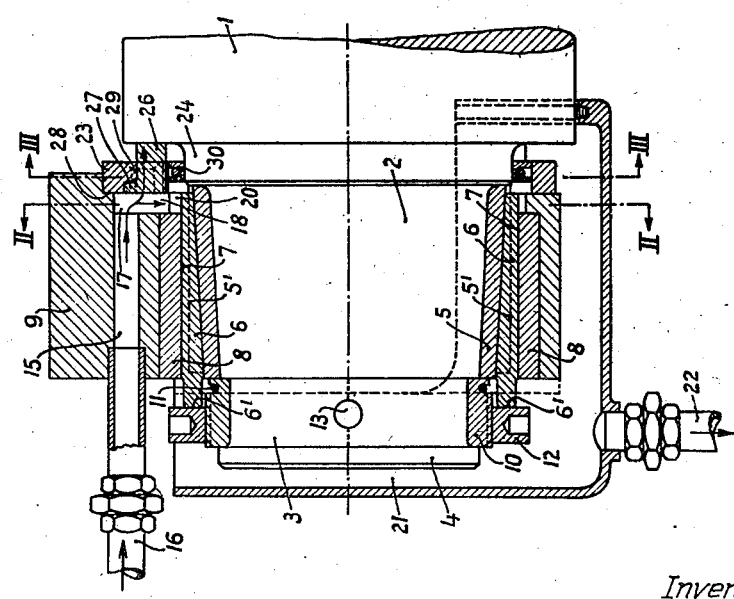
Inventors:

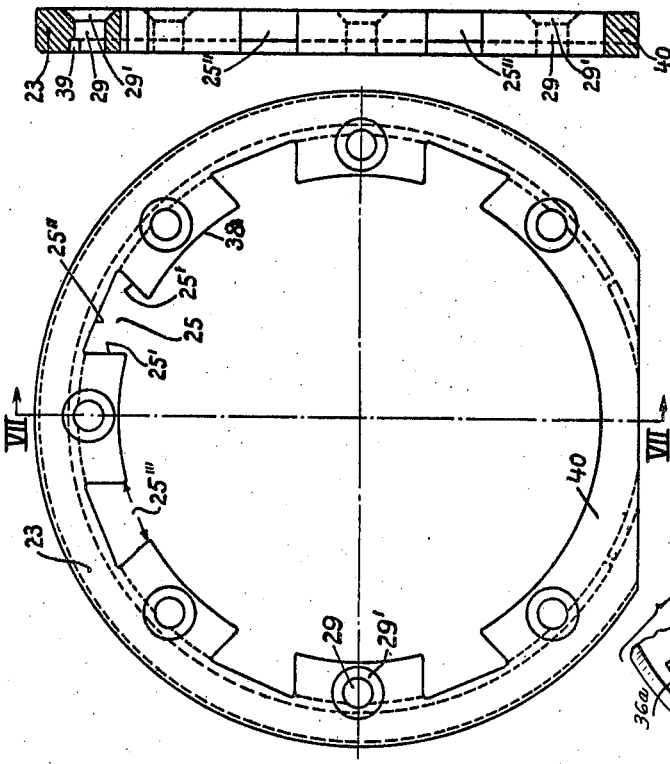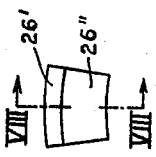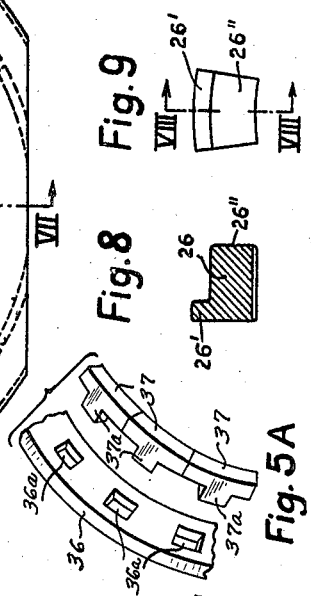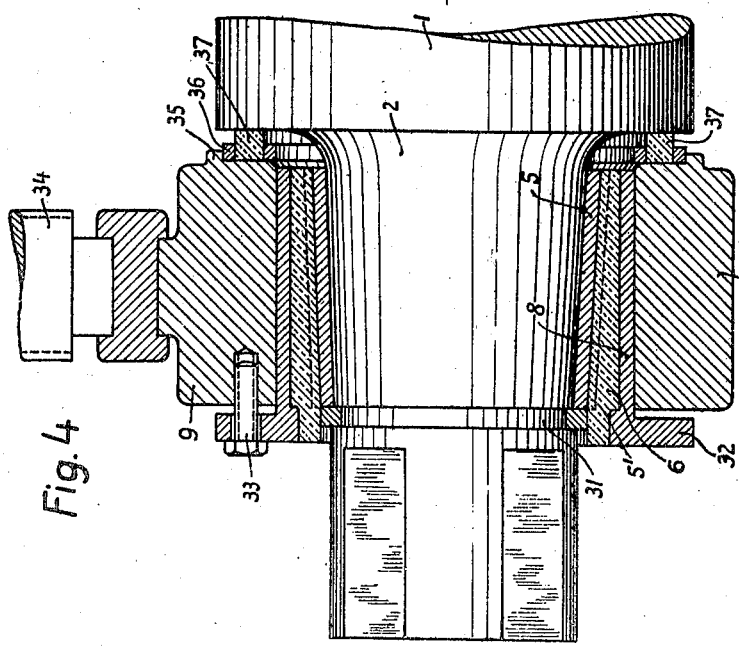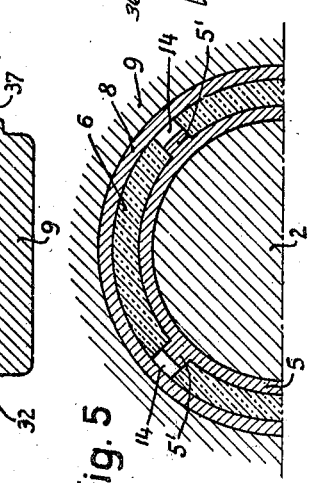

Patented May 16, 1944

2,348,873

UNITED STATES PATENT OFFICE 2,348,873

ADJUSTABLE BEARING

Theodor Wuppermann, Leverkusen-Schlebusch, near Cologne-on-the-Rhine, and Friedrich Koenig, Cologne-Mulheim, Germany; vested in the Alien Property Custodian Application January 27, 1940, Serial No. 315,990
In Germany January 27, 1939

6 Claims. (Cl. 308—71)

Adjustable bearings, in which that portion of the bearing offering greater resistance to wear, such as a steel bush, is arranged to be stationary, whilst the bearing portion of smaller resistance comprising, for example, a bush composed of a suitable bearing material, such as bronze, bearing metal or the like and fitted on the shaft or trunnion forms the rotatable portion, have already been proposed previously—in recognition of the fact that with an arrangement of the parts in the opposite sense a possible working in of the borne portion into the supporting portion is precluded, inasmuch as this action takes place, not in the vertically downward direction but, owing to the disposal of the resultant of bearing pressure and bearing friction, in a direction obliquely downwards. In this way the wear of the bearing portion of smaller resistance is caused to be of a uniform kind, so that to enable practically complete identity to be obtained between the mathematical and the virtual axis of rotation it is merely necessary to provide means which permit of a subsequent adjustment.

In the known arrangements the requisite adjustment has been rendered possible by furnishing both the rotatable bronze bush, which is shrunk on to the shaft, as well as the hardened stationary bearing bush, which surrounds the bronze bush, with conical bounding faces, which thus form the bearing surfaces. The adjustment is performed by displacement of the hardened bearing bush in the axial direction.

This arrangement, however, is not free from disadvantages. Each conical bearing surface leads to the occurrence of an axial thrust, which must be taken up by a separate axial retention of the mounted shaft. Although in conjunction with small bearings, such as those employed in tool machines, the axial retention is not confronted by any difficulties, these difficulties at once arise in the case of bearings of larger size, such as rolling mill bearings. To say the least the thrust bearings provided for the axial retention of the rollers are loaded to an unnecessary degree by the additional axial thrust, so that the problem arises of designing an arrangement of such a nature that a cylindrical bearing surface of the requisite kind is produced, in which unnecessary axial thrusts do not occur.

A conical bearing surface moreover has the disadvantage that the necessity for accurate adjustment is much greater than in an ordinary bearing, as if the axial adjustment is not exact, there at once occur between the supporting and the supported portions considerable differences in diameter, which greatly exceed the requisite clearance of the parts. In this way there is not only produced the usual eccentric displacement corresponding to the difference in clearance arising from wear, but in point of fact the displacement involved is greatly in excess of the degree of difference produced by the wear alone. This in the rolling mill technique is particularly disadvantageous because the quality of the rolled products depends on the extent to which it is possible to make the virtual axis of rotation coincide with the mathematical axis.

The problems involved are solved in accordance with the invention by the fact that in an adjustable bearing, and more particularly in a rolling mill bearing, in which the portion of the bearing offering greater resistance to wear is arranged to be stationary, whilst the bearing portion of smaller resistance forms the rotatable portion, the said rotatable portion comprises a plurality of sectors, which on their outer faces contact with the hollow-cylindrical bearing surface formed by the bearing portion of greater resistance, whilst in the direction of the roller trunnion they are furnished with adjustment faces, which are disposed at an angle to the longitudinal axis of the said trunnion and by means of which they are adjustable in common to bear against the said bearing surface with the desired degree of clearance. In other words the conical surface, which heretofore has been constituted by the bearing surface, is disposed between the shaft or the trunnion and the mounted portion firmly connected thereto. It is thus possible to vary the outer, i. e., the actual bearing surface with regard to its diameter, in which connection the separation into sectors must be accepted as a matter of necessity. This separation of the bearing surface of the mounted portion does not, however, present the least difficulty, and is as a matter of fact an advantage. Each sector can be furnished with the usual wedge form. The spaces between the sectors permit of the use of generous quantities of lubricating and cooling agents, so that a good cooling, scavenging and lubrication of the single bearing surfaces is accordingly ensured.

On the other hand, and more particularly in the case of rolling mill bearings, the separation into sectors presents certain difficulties with respect to the supply of lubricant to the bearing, so far as the sectors are produced from the usual bearing materials, such as bronze, bearing metal and the like. The arrangement in question necessitates the accommodation of the rotatable portion of the bearing, i. e., the portion of the bearing which is composed of the sectors, in a hollow-cylindrical steel bush, the inner face of which forms the bearing surface. To lubricate properly a bearing of this character the lubrication must be performed by a scavenging action, that is to say, the lubricant must be supplied in such an amount that there is not only produced the requisite lubricating film, but there is also obtained a cooling effect.

In other words the amount of the lubricant must be such that the heat generated in the bearing is discharged by the excess of lubricant. The problem accordingly arises of designing the spaces between the single sectors in such a way that they act as passages for the lubricant. If the lubricant consists of an oil or fat, difficulties are encountered in obtaining a proper sealing, as the lubricant must be supplied in excess from a stationary reservoir or fixed connection to the rotating intermediate spaces. These difficulties are particularly accentuated in the case of rolling mill bearings owing to the fact that the material being rolled has been raised to a high temperature, and splashes of lubricant may be flung on to the material and caused to be ignited, resulting in a burning or flaming of the lubricant with all the accompanying detrimental effects.

In its additional development the invention, for the purpose of overcoming the difficulties aforesaid, is based on the well known characteristic of synthetic resin bearings consisting in the fact that the lubrication of these bearings can be performed in a fully satisfactory manner by means of water. This characteristic can be utilised to permit of the adaptation of the desired form of bearing to rolling mills, since irrespective of the manner in which the water acting as lubricant and cooling agent may be supplied to the surface of the bearing there is obtained the advantage that a splashing or spraying about of the water will not lead to any difficulty whatsoever, whilst on the other hand the introduction of the lubricant is also facilitated by the fact that the water can be supplied, for example simply by spraying it into the spaces between the sectors, without the least consideration to adequacy or otherwise of the sealing of the parts.

Heretofore a particular advantage of synthetic resin bearings has been considered to reside in the fact that the water, which has been used quite generally for cooling and lubricating purposes, could be supplied to the bearing in practically uncontrolled fashion, for example could be applied to the surface of the bearing by way of a hose or the like. Particular importance has been attached to a simple and robust design of this nature, more particularly for rolling mill purposes, because in this way all complicated equipment, return cooling apparatus for the lubricant, pipes, pumps and control elements are rendered superfluous.

In comparison therewith it has been appreciated in the further development of the general idea constituting the basis of the invention that without departing from the fundamentally simple design of a synthetic resin bearing of the character in question there can be realised by a controlled guiding of the water which is employed as lubricant and cooling agent appreciable advantages, which take effect in a considerable reduction of the friction and the wear, with consequent prolongation of the life of the bearing, in a more exact adjustment of the mounted parts, and accordingly an increased accuracy in the rolling operation, and finally in a reduced consumption of the lubricating and cooling agent.

On the basis of these considerations adjustable bearings in accordance with the invention, and more particularly rolling mill bearings, wherein the portion of the bearing offering greater resistance to wear is arranged to be stationary, whilst the bearing portion of smaller resistance forms the rotatable portion and preferably comprises a plurality of segments, which on their outer faces contact with the hollow-cylindrical bearing surface formed by the bearing portion of greater resistance, whilst in the direction of the roller trunnion they are furnished with adjustment faces, which are disposed at an angle to the longitudinal axis of the said trunnion and by means of which they are adjustable in common to bear against the said bearing surface with the desired degree of clearance, are additionally characterised by the fact that in the stationary and rotatable portions of the bearing there are provided in a definite location spaces or recesses in the form of passages, borings, ducts or the like, so that there is imparted to the cooling and lubricating agent by the parts of the bearing to be cooled and lubricated a guiding action of a positive nature which is predetermined by the disposal of the recesses or the like. If the rotatable portion of the bearing is composed of synthetic resin segments, the spaces between the rotating segments can be made to form part of the series of recesses, whereby the possibility is arrived at of causing the lubricating and cooling action to proceed from these spaces, so that a proper delivery of lubricant to the faces to be cooled and lubricated is definitely ensured. In order to make provision for an even supply of lubricant to the spaces between the segments there can be provided in a portion surrounding the segments, for example in the bearing box or casing, annular recesses, which are preferably disposed concentrically to the longitudinal axis of the mounted trunnion and communicate with the said spaces, so that the cooling and lubricating agent is distributed evenly to the complete number of spaces between the single segments.

If the portion of the bearing surrounding the segments, for example the bearing casing, is composed of sectors, between which there are provided radially disposed passages which connect up the annular recesses serving to receive the cooling and lubricating agent and to distribute it to the separate segments, the end faces of the sectors can be designed as a seat to accommodate an axial thrust bearing, the cooling and lubrication of which can thus be simplified in a manner which will be described later.

If the outlet openings for the cooling and lubricating agent are smaller in cross-section than the passages for the same which, in the direction of flow, precede the said outlet openings, the cooling and lubricating agent, owing to the increase of pressure, will completely fill out the passages. In this way there is obtained a comparatively high rate of flow, and accordingly an appreciable transfer of heat, so that the bearing remains cool and in consequence thereof is in a condition to withstand much greater bearing pressures than those which heretofore have been considered to constitute the safety limit.

It has already been stated that a particularly convenient form of lubrication and cooling of the axial thrust bearing can be obtained by designing the connections between the annular recesses, which receive the cooling and lubricating agent and distribute it over the various segments, in the form of passages having intervening sectors, the end faces of which constitute a supporting surface for the said thrust bearing. If the walls confining the annular recesses for distributing the cooling and lubricating agent are formed in part by the bounding faces of the segment-supporting ring, which is disposed between the stationary and rotatable portions of the bearing in such a way that it receives the axial pressure by way of the segments, the cooling and lubricating agent will find a steady access to the bearing faces formed by the segments. The supply of the cooling and lubricating agent to the axial thrust bearing composed of the said segments can be improved by furnishing the supporting ring with recesses, which are preferably disposed between the segments and by way of which the cooling and lubricating agent, which is passed to the annular recess bounded in part by the supporting ring for the purpose of distribution over the segments, is caused to emerge in even distribution about the entire periphery of the axial thrust bearing and thus to exert the requisite cooling and lubricating action.

At the same time the portion of the bearing surrounding the segments, for example the bearing casing, forms sectors, the end faces of which act as a seat for the segments or the supporting ring, so that the axial pressure received by the segments is transmitted to the stationary bearing portions and discharged without any loading of the supporting ring itself, so that this ring is not required to take over any forces but merely to secure the segments against a variation in their position.

It is naturally also possible within the meaning of the invention to provide means the axial thrust bearing can be subjected to any desired adjustment later. Thus, for example, it is possible to provide for adjustment of the bounding surface of the seat adapted to support the ring and the segments by making the said seat adjustable in the axial direction. This, however, in no way affects the fundamental design of the supporting ring and the embodiment and arrangement of the segments, so that the above remarks apply literally to bearings which are intended for a subsequent adjustment.

The invention is illustrated by way of example in the accompanying drawings in its application to a rolling mill bearing.

Fig. 1 is a longitudinal section through the bearing and the roller trunnion, whilst Fig. 2 is a cross-section taken on the line II—II in Fig. 1, and Fig. 3 is a cross-section taken on the line III—III in Fig. 1.

Fig. 4 is a longitudinal section through a modified embodiment of the bearing, whilst Fig. 5 is a cross-section through the embodiment according to Fig. 4.

Figure 5A is an exploded isometric view showing the structural features of members 36 and 37.

Fig. 6 is a plan view of the supporting ring, from which the synthetic resin segments have been omitted.

Fig. 7 is a cross-section taken on the line VII—VII in Fig. 6.

Fig. 8 is a cross-section through a synthetic resin segment taken on the line VIII—VIII in Fig. 9, whilst Fig. 9 is a plan view of a segment.

In the drawings 1 is a roller and 2 the roller trunnion, which possesses at 3 an abutment of reduced diameter and at 4 a collar. The trunnion 2 is of conical form. On to this trunnion there is shrunk a steel bush 5, which is likewise conical on its outer periphery, and the cross-sectional form of which is disclosed by Fig. 2. The bush 5 is furnished with ribs 5', which are also conical. Between the ribs there are thus formed recesses, in which there are accommodated segments 6 composed of synthetic resin. The segments 6 possess in their entirety a cylindrical outer face, along which they contact with a hollow-cylindrical bearing surface 7, which is formed by a bearing bush 8 preferably composed of steel. The bearing bush 8 is situated within a casing or fitting 9. On the trunnion portion 3 of reduced diameter there is provided a threaded ring 10, which comprises a plurality of parts held together by a split ring 11. On the external thread of the ring 10 a nut 12 is so mounted that the end faces 6' of all synthetic resin segments 6 are caused to bear against the face of the nut directed towards the roller 1.

It is accordingly merely necessary to turn the nut 12 on the threaded ring 10 for the purpose of varying the axial position of the synthetic resin segments 6 as desired. Owing to the conical form of the bush 5 an axial displacement of the segments 6 also causes them to be moved in the radial direction, so that in this way they can be readily adapted to the hollow-cylindrical bearing surface 7 of the stationary bearing portion 8. The segments 6 rotate together with the bush 5, and at the same time they can be adapted to the part 8 collectively and in common. The adjusted position of the threaded ring 10, and accordingly the axial and radial position of the segments, is secured by a bolt 13.

For a proper guiding of the cooling and lubricating agent the means provided are as follows:

In the fitting or bearing casing 9 there are provided borings 15, which communicate with a water supply source 16. The borings 15 open out into an annular recess 17 in the casing 9. Radially inwards the annular recess 17 is confined by sectors 18, which are embedded in the bearing bush 8 and fitting 9 and are so disposed that intermediately of the same there are located radial passages 19, by way of which the cooling and lubricating agent can be conducted to a second annular recess 20 in the casing or fitting 9. With the annular recess 20 there communicate the spaces 14 disposed intermediately of the segments 6, the complete arrangement resulting in a definite disposal of the recesses 15, 17, 19, 20 and 14, by way of which there is imparted to the cooling and lubricating agent by the parts to be cooled and lubricated a definite guiding action, which is predetermined by the particular arrangement of the recesses.

The lubricant is passed out between the separate segments and can then be discharged in any suitable manner, for example by means of an intercepting container 21 and drain 22.

For the purpose of obtaining an analogous guiding of the cooling and lubricating agent also with respect to the axial thrust bearing additional means are provided as follows:

A ring 23 provided in the fitting 9 possesses towards the enlarged abutment 24 of the roller trunnion dovetail recesses 25, in which there are fitted segments 26 composed of synthetic resin. These segments bear with their end faces directed towards the roller 1 against the collar formed between the roller 1 and the flared portion 24, whilst on the other hand they are also supported against the end faces of the sectors 18 of the fitting 9. A collar 27 on each segment 26 prevents the segments from falling out. In this way the end face 28 of the ring 23 and the end faces of the segments 26, 27 bound the annular space 17 and the passages 19, so that the cooling and lubricating agent conducted through these passages is enabled to obtain access to the segments 26, 27. This effect can be enhanced by furnishing the ring 23 between the segments 26, 27 with borings 29, by way of which the cooling and lubricating agent flowing through the passages 17, 19 is able to pass in direct fashion to the axial thrust bearing surface formed between the segments 26 and the roller 1. There is thus obtained with respect to the cooling and lubricating agent which is supplied to the axial thrust bearing a definite sequence of supply passages in the form of the recesses 15, 17, 19 and 29.

As shown by the drawings, the cross-section of the passages 14, which is to be regarded as the outlet cross-section for the lubricant, is smaller than the cross-section of the passages which, in the direction of flow of the lubricant and cooling agent, precede the outlet cross-section, so that owing to the increase in pressure all of the passages are completely filled out by the lubricating and cooling agent. In this way there is ensured a steady and even supply of lubricating and cooling agent to the bearing surface 7 between the parts 6 and 8.

In order to prevent the cooling and lubricating agent from emerging between the flanged abutment 24 and the supporting ring there is provided a shaft packing 30 of the conventional kind, which forms an effective seal at this point.

A modified embodiment of the bearing is illustrated in Figs. 4 and 5.

In this case the roller 1 is also furnished with a conical trunnion 2. On to the trunnion 2 there is shrunk a bush 5 composed of forged steel or the like, which is also secured against axial displacement by means of a multi-part split ring 31. On its outer face, which is also of conical form, the steel bush 5 is furnished with ribs 5'. In the groove-like recesses formed intermediately of the said ribs there are arranged so as to be longitudinally shiftable trough-shaped segments 6 composed of a bearing material offering less resistance to wear, for example bearing metal or synthetic resin. The segments 6 again form on their inner faces a conical surface corresponding to the outer face of the steel bush 5. Their outer faces on the other hand form a cylindrical surface.

Towards the end face of the shaft trunnion the segments 6 are made to project in collar-like fashion, and with the collar thus formed they serve to support the multi-part ring 31, so that special precautions for maintaining the assembly are thus rendered unnecessary.

The face opposite the outer faces of the segments is formed by a hollow-cylindrical recess in the steel bush 8. The slip surface directed towards the segments 6 can be subjected to a suitable metallurgical treatment for the purpose of reducing the friction, for example may be burnished, chromium plated, nitrated or otherwise preliminarily treated. The outer portion of the bush 8 is designed to form a flange 32, through which there are passed screws 33, the threaded portions of which are received by the casing or fitting 9. The flange 32 bears with an internal annular abutment against a corresponding shoulder on the segments 6, so that these segments can be adapted similarly and collectively to the bearing surface formed by the bearing portion 8. Any adjustment thus made does not vary the axial position of the segments 6 with respect to the bush 8, so that any working in of the bearing which has taken place in the meantime is not destroyed in consequence of the adjustment. The casing 9 is held in the rolling mill frame (not shown) by any suitable means, such as threaded members 34.

Immediately the effects of wear make themselves apparent the segments 6 can be adjusted accordingly, similarly and in common, by tightening the screws 33. The segments 6 are then caused to slide upwards along the outer conical wall of the bush 5, whereby the diameter of their outer circle is at the same time increased. In this way the bearing can be adjusted to the desired degree. In consequence the position of the trunnion 2 can be continuously maintained, that is to say, the virtual axis of rotation can be made to agree as near as possible with the mathematical axis.

The means provided to receive the axial thrust are as follows: In the casing or fitting 9, which for this purpose is furnished with a special annular abutment 35, there is located a ring 36 having fitted therein a series of segments or plugs 37, which may consist of synthetic resin or also any other bearing material. The wide end faces of the plugs or segments 37 bear against the roller 1, or against the surface of a special collar provided thereon, so that in this way the axial thrust can be transmitted by way of the plugs or segments 37 to the casing 9, whereas the narrow end faces 37a fit into openings 36a in ring 36. The plugs or segments can naturally also be furnished with adjustment means for the purpose of adjusting the axial play.

The passages 14 situated between the sectors 6 are preferably designed as passageways for the cooling and lubricating agent, which is raised to an increased pressure and, in the event of the plugs or segments 37 consisting of synthetic resin, will be water. It is naturally also possible to provide borings in the sectors 6, or to furnish other means for supplying a lubricating and cooling or scavenging agent to the bearing surface.

Figs. 6 and 7 are plan and cross-sectional views respectively showing the supporting ring 23 for the segments 26, details of the segments themselves being shown in Figs. 8 and 9.

In Figs. 6 and 7 the supporting ring is designated 23. This ring possesses on its inner bounding face 38 openings 25 of trapezoidal cross-section. The arrangement is such that the smaller of the two parallel edges 25'' and 25''' of the trapezium, i. e., the edge 25''', coincides with the inner bounding face, so that dovetail undercut recesses 25 are formed, in which an element of the same cross-sectional form is protected against displacement by the fact that the bounding faces 25' of the recess 25 act as a seating. The ring 23 possesses an annular groove at 39. Between the trapezoidal openings 25 there are provided additional recesses 29 in the form of borings, which are enlarged conically at 29'. In the vicinity of the supporting ring at 40 the trapezoidal openings 25 are omitted, as at this point they can be dispensed with. In consequence the height of the bearing can be reduced accordingly.

Figs. 8 and 9 show the form of the synthetic resin segments fitted in the trapezoidal recesses 25 and receiving the axial load of the bearing. The synthetic resin segments include a plug-like portion 26 having a trapezoidal cross-section agreeing with the form of the recesses 25. The end faces 26" of the segments 26 form the axial pressure surface in conjunction with the mounted element. On the plug-like bases 26 of the segments there are provided collar portions 26', which are accommodated in the annular groove 30. In this way the segments are prevented from falling out of the supporting ring 23 in the direction towards the bearing surface of the axial thrust bearing.

What we claim as new and desire to secure by Letters Patent is:

1. Adjustable bearing, more particularly rolling mill bearing, comprising in combination a stationary bearing portion composed of a material offering a high resistance to wear, said stationary bearing portion forming a hollow-cylindrical bearing surface, a rotatable bearing portion, said rotatable bearing portion consisting of a rotatable support, and spaced sectors thereon, said sectors composed of materials offering less resistance to wear, said sectors being axially adjustable against their support having a conical contact against the rotatable support while their outer bounding surface constitutes a cylindrical wall surface, and means for effecting the mutual axial adjustment of all sectors.

2. Adjustable bearing, more particularly rolling mill bearing, comprising in combination a stationary bearing portion composed of steel, said stationary bearing portion forming a hollow-cylindrical bearing surface, a rotatable bearing portion, said rotatable bearing portion consisting of a rotatable support, and spaced sectors thereon, said sectors consisting of artificial resins, said sectors being axially adjustable against their support having a conical contact against the rotatable support while their outer bounding surface constitutes a cylindrical wall surface, and means for effecting mutual axial adjustment of all sectors.

3. Adjustable bearing, more particularly rolling mill bearing, comprising in combination a stationary bearing portion composed of a material offering a high resistance to wear, said stationary bearing portion forming a hollow-cylindrical bearing surface, a rotatable bearing portion, said rotatable bearing portion consisting of a rotatable support, and spaced sectors thereon, said sectors composed of materials offering less resistance to wear, said sectors being axially adjustable against their support having a conical contact against the rotatable support while their outer bounding surface constitutes a cylindrical wall surface, the bounding edges of said sectors being parallel to each other, and means for effecting the mutual axial adjustment of all sectors.

4. Adjustable bearing, more particularly rolling mill bearing, comprising in combination, a stationary bearing portion composed of a material offering a high resistance to wear, said stationary bearing portion forming a hollow-cylindrical bearing surface, a rotatable bearing portion, said rotatable bearing portion consisting of a rotatable support, and spaced sectors thereon, said sectors composed of materials offering less resistance to wear, said sectors being axially adjustable against their support having a conical contact against the rotatable support while their outer bounding surface constitutes a cylindrical wall surface, means for effecting the mutual axial adjustment of all sectors, said adjustment means being arranged on the end face of a trunnion carrying the rotatable sectors, a casing for the stationary bearing portion, channels and recesses arranged in said casing and communicating with the spaces between the sectors for the distribution of lubricating and cooling agents, and said distributing channels arranged opposite the end face of the support of the sectors in the casing.

5. Adjustable bearing, more particularly rolling mill bearing, comprising in combination a stationary bearing portion, said stationary bearing portion forming a hollow-cylindrical bearing surface, a rotatable bearing portion, said rotatable bearing portion consisting of a rotatable support, and spaced sectors thereon, said sectors being axially adjustable against their support having a conical contact against the rotatable support while their outer bounding surface constitutes a cylindrical wall surface, means for effecting the mutual axial adjustment of all sectors, a casing for the stationary bearing portion, said casing having a passageway therein for communicating with the spaces between the sectors for the distribution of lubricating and cooling agents, spaced segments adapted to take up the axial thrust, a holder for the latter segments, the segments and holder being arranged between stationary and rotatable portions of the bearing, said holder and segments forming bounding faces of said passageway, and said annular member having openings therein leading from the passageway, whereby lubricating agents can be discharged onto the axial thrust faces.

6. Adjustable bearing, more particularly rolling mill bearing, comprising in combination a stationary bearing portion, said stationary bearing portion forming a hollow-cylindrical bearing surface, a rotatable bearing portion, said rotatable bearing portion consisting of a rotatable support, and spaced sectors thereon, said sectors being axially adjustable against their support having a conical contact against the rotatable support while their outer bounding surface constitutes a cylindrical wall surface, means for effecting the mutual axial adjustment of all sectors, a casing for the stationary bearing portion, said casing having a passageway therein for communicating with the spaces between the sectors for the distribution of lubricating and cooling agents, spaced segments adapted to take up the axial thrust, an annular member for supporting said segments and being arranged between stationary and rotatable portions of the bearing, one face of said annular member communicating with said passageway, and recesses in said annular member adapted to allow of the discharge of lubricating and cooling agents from the passageway into the spaces between the segments adapted to receive the axial thrust and to lubricate the axial thrust faces.

THEODOR WUPPERMANN.
FRIEDRICH KOENIG.